A. O. TATE.
LOOKOUT DEVICE.
APPLICATION FILED AUG. 14, 1919.
1,369,058.
Patented Feb. 22, 1921.
2 SHEETS—SHEET 1.
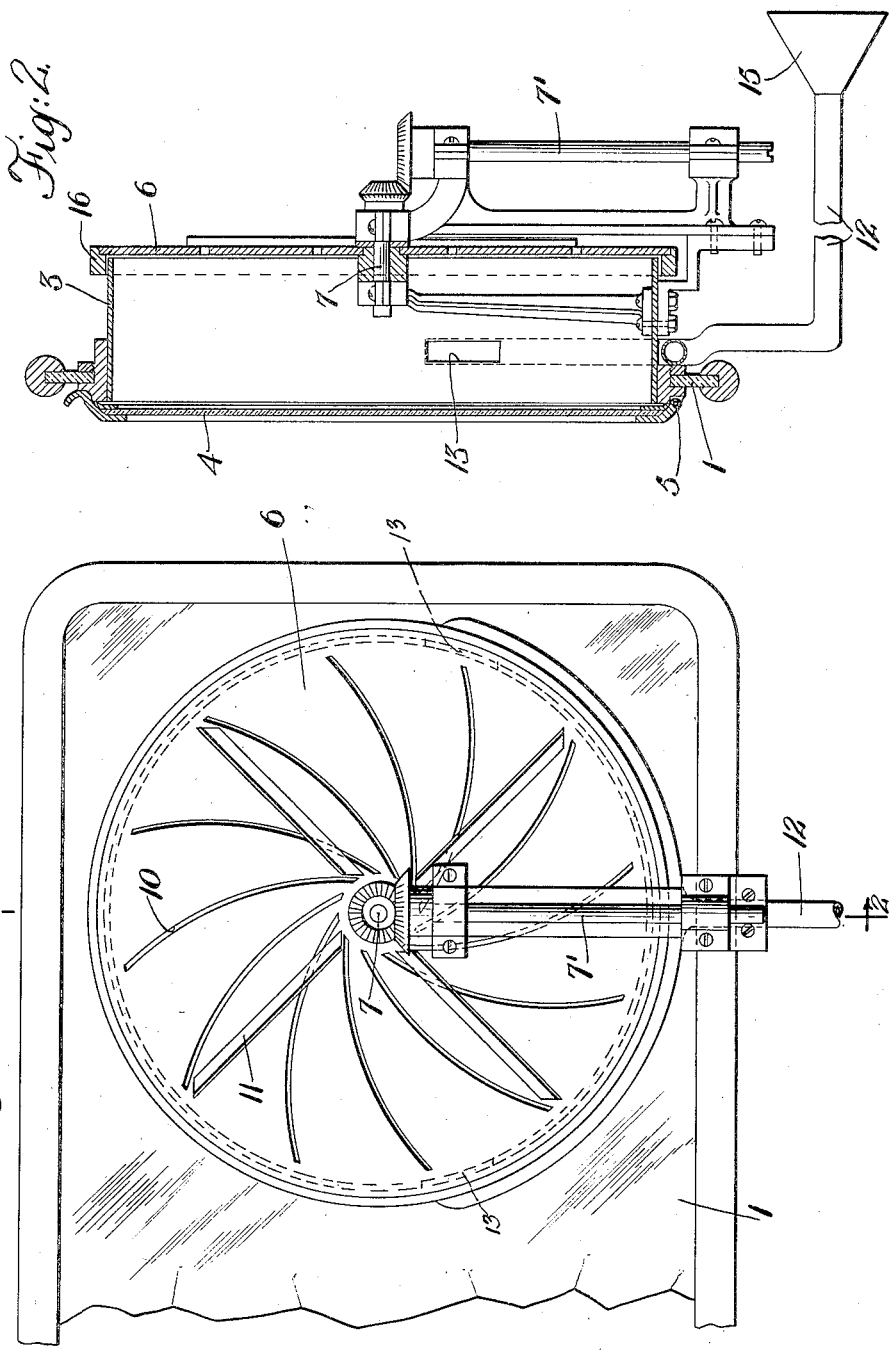
Inventor
Alfred O. Tate
By his Attorneys
Sheffield & Betts

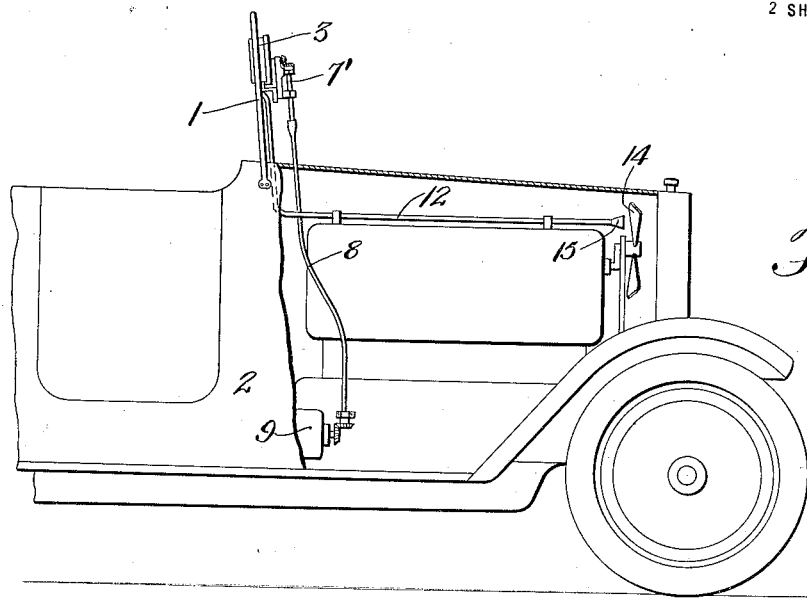
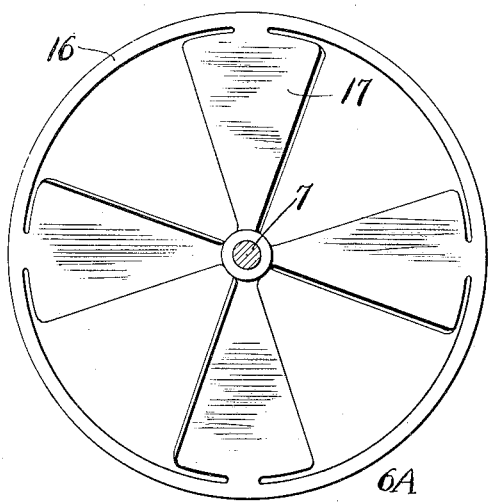
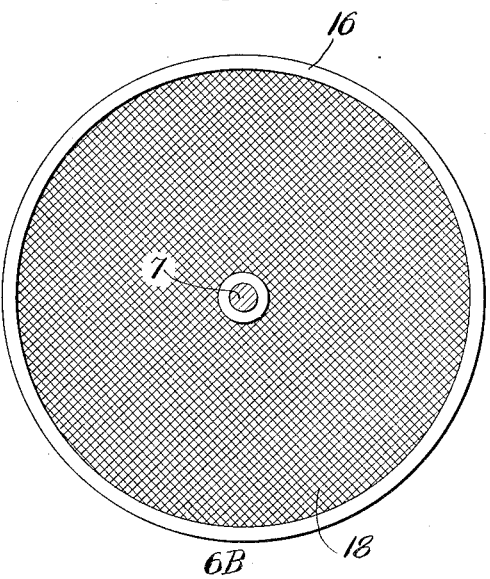

UNITED STATES PATENT OFFICE.

ALFRED O. TATE, OF NEW YORK, N. Y.

LOOKOUT DEVICE.

1,369,058.　　　　Specification of Letters Patent.　　Patented Feb. 22, 1921.

Application filed August 14, 1919. Serial No. 317,484.

*To all whom it may concern:*

Be it known that I, ALFRED O. TATE, a subject of the King of Great Britain, and a resident of the borough of Manhattan, city, county, and State of New York, have invented certain new and useful Improvements in Lookout Devices, of which the following is a specification.

My invention relates to the art of improving vision under difficult conditions and has as its principal object the provision of means whereby the eye is protected from solid particles in the air such as cinders, rain, or sleet and whereby at the same time the adverse conditions are prevented from reducing substantially the clarity of vision.

A further object of my invention is to prevent glare from the road or the like from interfering with the vision of the driver of the vehicle.

Heretofore drivers of vehicles have had their vision impaired during stormy weather by the fact that the rain or snow beat into their faces, or else settled on the glass used in front of their eyes and rendered it difficult to see through, both by cutting off light and refracting it. Drivers have also experienced difficulty in obtaining clear vision when the objects in the line of sight have been under very intense light.

By my invention the difficulties arising from the abnormal conditions mentioned are eliminated.

The novel features of my invention are pointed out with particularity in the appended claims. The invention itself, however, with further objects and advantages may best be understood from the following description taken in connection with the accompanying drawing in which:

Figure 1 is a front elevation, somewhat diagrammatic in character, of a portion of the windshield of an automobile having my invention applied thereto.

Fig. 2 is a sectional view taken on the line 2—2 of Fig. 1.

Fig. 3 is an elevational view partly broken away of an automobile having my invention applied thereto.

Fig. 4 is an elevation of a different form of revolving disk, one form appearing in Fig. 1.

Fig. 5 is a similar view of a third form of disk.

Referring to the drawing, 1 is a windshield mounted on a vehicle such as 2. The windshield has an opening therein in which is mounted a cylindrical casing 3, the axis of which is at right angles to shield 1. The rear end of the casing 3 is preferably covered by a window 4 which may be hinged as at 5. Over the front end of the casing is a disk 6 mounted to revolve on an axis 7. The disk 6 is of substantially opaque material, but has openings therein whereby a clear view may be had through the disk when it is revolved at a good rate of speed. The particular speed employed may be varied within considerable limits at will, there being no upper limit to the speed so far as optical considerations are concerned. For the type of disk shown in Fig. 1, I do not recommend a speed of less than 1000 R. P. M.

Any suitable means may be employed to drive disk 6 and I have illustrated an arrangement by which the disk is geared to a shaft 7' which is connected to a flexible extension 8, the latter being geared to a shaft on a motor 9. The rotation of disk 6 is sufficient of itself to prevent the passage of so large a percentage of solid particles through slots 10 that for any but very severe conditions no further means are necessary to insure satisfactory vision, but I prefer to fix inclined radial fan blades, such as 11, to the outer face of disk 6, whereby an outward flow of air is caused from the interior of casing 3 through slots 10, to further prevent the entrance of rain and the like to the interior of casing 3, a current also being caused by blades 11 in the general direction from the center toward the edge across the outer face of the disk assisting in preventing entrance of particles by helping to keep the disk clean.

The effect of blades 11 may be reinforced by forcing air into the interior of casing 3, and by forcing warm air into the casing moisture is prevented from condensing on the surface of window 4 even when changes of temperature might otherwise cause condensation to occur. For this purpose, I provide an air pipe 12 arranged to deliver air into casing 3 near the center thereof at two points, such as 13, on opposite sides of the casing. The air being introduced into the casing 3 in oppositely directed streams, the two streams will meet near the center of the casing, giving an effect as if the air were all introduced at the point of intersection of the streams. This point being substantially at the center of the casing, the air will flow out through the openings in disk 6 at a substantially uniform rate over the whole face of the disk. A convenient source of warm air for the pipe 12 in the automobile vehicle is the air which has just passed through the radiator and to take advantage of this I make the pipe 12 adjacent the usual fan, such as 14, and enlarge the end of pipe 12 into a funnel, 15, placed with its large end directed into the stream of air from the fan 14.

To prevent any tendency for air to force its way into casing 3 around the edges of disk 6, I make the disk of slightly greater diameter than the casing 3 and fix a ring 16 to disk 6 so that it overlaps the forward edge of the casing. The air being prevented from entering around the edge of the casing, solid particles are also excluded. It is evident that the use of a revolving disk in front of the eye according to my invention, protects not only the eye from solid particles, but from excess light, while maintaining the line of sight free from refraction.

In Fig. 4 I have illustrated a disk $6^A$ which may be substituted for disk 6 according to my invention. In the disk $6^A$ the apertures are enlarged as compared with disk 6 and a fan effect is obtained by the conformation of portions of the disk proper as indicated at 17.

In Fig. 5, I have illustrated a disk $6^B$ which may also be substituted for disk 6 according to my invention, disk $6^B$ comprising a woven wire portion 18 attached to a central hub and to the outer ring 16.

It will be understood that while I have described my invention with particular reference to its use with a moving vehicle, I do not wish to be limited to this use as my invention is of value wherever clear vision is difficult due to solid particles or to excess of light.

Having thus described my invention, I claim:

1. A lookout device comprising an apertured disk, means for revolving said disk, and means for causing an air current in front of the face of said disk in a general direction from the center to the edge thereof.

2. A lookout device comprising an apertured disk, means for revolving said disk, and means for creating a current of warmed air through the apertures in said disk.

3. A lookout device comprising a shield member having an opening therein, an apertured disk in said opening, means for revolving said disk, and means for forcing warmed air through the apertures in said disk.

4. A lookout device comprising a transparent shield member having an opening therein, an apertured disk in said opening, means for revolving said disk, and means for forcing warmed air through the apertures in said disk.

5. The combination with a vehicle of a lookout device comprising an apertured disk, means for revolving said disk, and means for causing an air current across the face of said disk in the general direction from the center to the outer edge thereof.

6. The combination with a vehicle of a lookout device comprising an apertured disk, means for revolving said disk, and means for creating a current of warmed air through the apertures in said disk.

7. The combination with a vehicle of a lookout device comprising a shield member having an opening therein, an apertured disk in said opening, means for revolving said disk, and means for forcing warmed air through the apertures in said disk.

8. The combination with a vehicle of a lookout device comprising a transparent shield member having an opening therein, an apertured disk in said opening, means for revolving said disk, and means for forcing warmed air through the apertures in said disk.

9. A lookout device comprising, in combination, a casing, an apertured disk revolubly mounted at one end of said casing, a transparent covering for the other end of said casing, said covering being adapted to be moved from in line with the casing, and a pipe for introducing air into said casing.

10. A lookout device comprising, in combination, a casing, an apertured disk revolubly mounted at one end of said casing, transparent covering for the other end of said casing, and means normally securing said covering to said casing and permitting its movement with respect to the casing without disturbing said disk.

11. The combination with a transparent wind shield of a casing mounted therein, an apertured disk revolubly mounted at one end of said casing, means for rotating said disk at high speed, and a transparent covering for the other end of said casing.

12. The combination with a transparent wind shield of a casing mounted therein, an apertured disk revolubly mounted at one end of said casing, means for rotating said disk at high speed, a transparent covering for the other end of said casing, and means for introducing air into the casing.

ALFRED O. TATE.